G. E. WRIGHT.
APPARATUS FOR WASHING AND SCALDING VEGETABLES.
APPLICATION FILED DEC. 30, 1910.
1,019,111.
Patented Mar. 5, 1912.
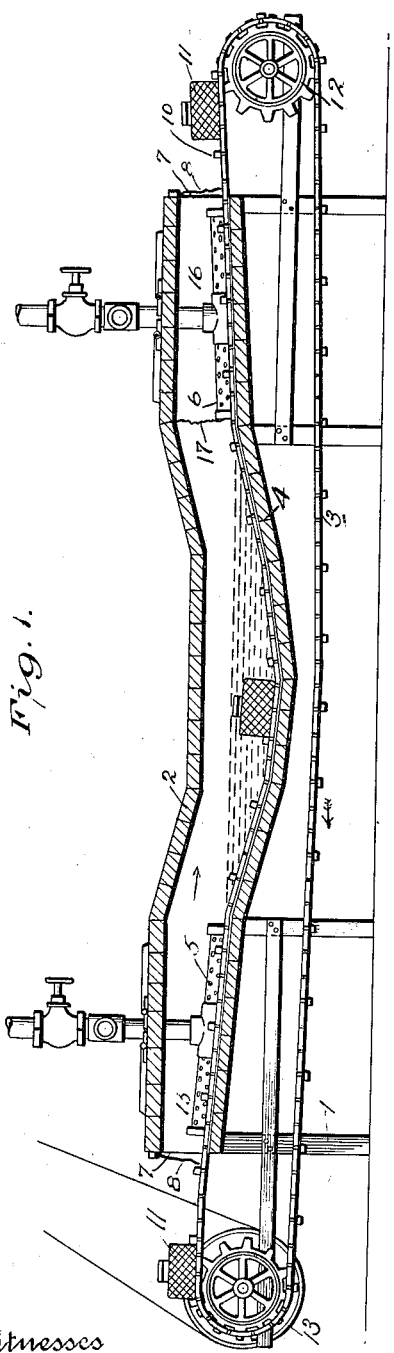
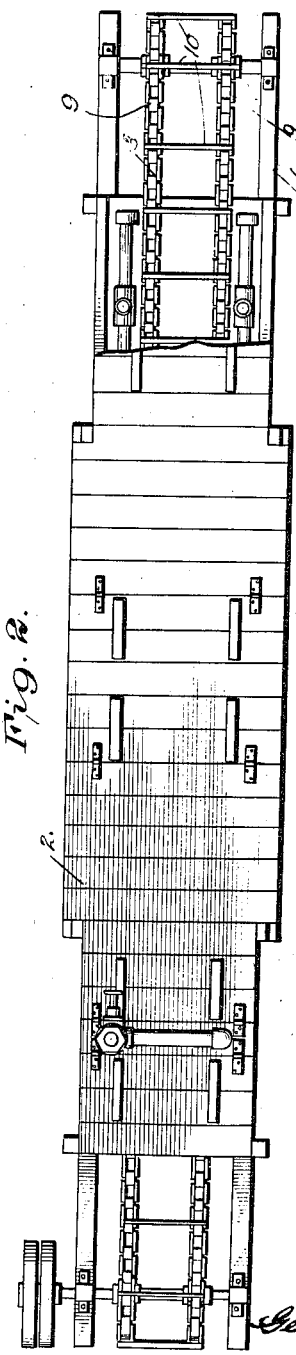

UNITED STATES PATENT OFFICE.

GEORGE E. WRIGHT, OF ABERDEEN, MARYLAND.

APPARATUS FOR WASHING AND SCALDING VEGETABLES.

1,019,111.   Specification of Letters Patent.   Patented Mar. 5, 1912.

Application filed December 30, 1910. Serial No. 600,034.

*To all whom it may concern:*

Be it known that I, GEORGE E. WRIGHT, a citizen of the United States of America, residing at Aberdeen, Harford county, State of Maryland, have invented certain new and useful Improvements in Apparatus for Washing and Scalding Vegetables, of which the following is a specification.

This invention relates to an apparatus for carrying out my process claimed in my United States Patent No. 969,238, issued to me September 6th, 1910, for scalding and washing tomatoes and other vegetables preparatory to canning. Its object is the improvement of such apparatus whereby the product is more quickly and perfectly cleaned, more evenly scalded, with less resulting damage, and is treated with little contact with the hands of the operator.

In its preferred form my apparatus consists of a closed chamber or box to one or both ends of which steam, or other heating medium, is supplied by any suitable means, as perforated pipes, steam nozzles, etc. In or near the center of the machine is a basin which may be formed by depressing the floor at this point. This basin is to hold water through which the fruit or vegetables being treated are passed to wash them. The ends of the box are apertured to provide for the admission and removal of the product, and these apertures are preferably closed by means of flaps to prevent, as far as possible, the escape of steam. A conveyer as a chain passing longitudinally through the box and dipping into the basin may be provided. The bottom or floor of the box serves as a guide or support for such conveyer which may be maintained in contact with the floor by the weight of the product, or other suitable means.

In practice, cages or baskets of perforated or foraminous material may be used, the vegetables may be otherwise held or laid on the conveyer. If the foraminous receptacles are used, they are filled with the vegetables or fruit in the field or at the point of delivery to the factory, so that the fruit may be handled as little as possible. These cages are placed on the conveyer in front of the steam box and carried by the conveyer through the chamber or box, being first treated with live steam, then immersed in hot water, and finally treated, preferably with steam or heated air. From this point, the cage is moved out of the chamber and is removed from the conveyer. The fruit or vegetables are then taken from the baskets, peeled and placed immediately in cans and sealed.

By placing the steam chamber in the rear of the bath, I shorten the process of washing, as the dirt and foreign matter are loosened by the steam during the first scalding much more quickly than they would be in a bath of hot water. Also, in this way, I scald the surface so that the skin may be removed without cooking the interior of the fruit or vegetables, and thus I retain the natural flavor. As the fruit is not internally cooked, it retains more of its original consistency, form and color, and is, therefore, more attractive. Treating the fruit in baskets, as shown, aids in this result, as the necessary handling is reduced to a minimum. The drying means in front of the bath provides for the removal of surplus moisture before canning.

The accompanying drawing illustrates a machine to which my invention has been applied.

Figure 1 is a longitudinal, vertical section of the machine. Fig. 2 is a top plan.

In the machine as shown there is a frame 1 which supports a steam box 2 and a conveyer 3. The chamber is elongated in the direction of the traverse of the conveyer and apertured at its ends so that the upper half of the conveyer which is in the form of two horizontal chain belts passes through the chamber, and the conveyer is sufficiently loose so that when loaded it rests on the floor or bottom wall of the chamber. The latter is depressed centrally at 4 to form a tank to be filled with water and at the ends of the chamber beyond the tank 4 are perforated steam pipes 5 at the rear in the steam chamber 15, and, if desired, there may be also similar pipes 6 at the front in the drying chamber 16. The apertures 7 at the front and rear of the chamber are closed by means of curtains 8 to allow the passage of the product and, at the same time, to prevent the escape of steam. The parallel chains 9 which form the conveyer 3 are connected by means of transverse spaced bars 10 between which are placed cages or baskets 11 constructed of perforated or foraminous material to receive the fruit or vegetables to be treated and to allow the passage of the steam and water into contact with the product. The conveyer is driven in the direction of the arrows by means of suitable gears 12 and 13, so that the cages or baskets are moved from front to rear of the machine as described.

The application of steam, which is preferably at a pressure of eighty (80) pounds in the boiler, will give a temperature in the steam box of between 275° and 300° F. This is high enough to produce in about ten seconds a change in the structure of the skin sufficient to loosen it and permit it to be removed. The steam will also loosen the dirt, so that when the fruit is passed into the water bath for ten seconds, the dirt will fall off. The water is of much lower temperature than the steam and will not cook the fruit to any material extent, and may be at a temperature at which it will arrest the cooking process. The passage of the fruit through the second chamber 16, i. e., when it emerges from the water, will serve to dry it, so that when removed from the scalder it will be not only thoroughly scalded but practically dry. The scalding is done very rapidly and penetrates but a very short distance into the fruit, scarcely further than the under side of the skin. If very exact scalding is desired, air may be substituted for the steam in the rear chamber for drying, and for this purpose the front and rear chambers may be separated by a curtain 17, or otherwise, and the temperature of the air may be regulated so as never to subject the fruit, after it leaves the first steam bath, to a temperature as high as the live steam.

What I claim and desire to secure by Letters Patent is:

1. An apparatus for treating vegetables for canning which consists of a steam box, means for supplying live steam at the rear, and drying medium at the front of such box, a tank for water in the middle portion of the box, and a conveyer for vegetables passing through the box, means for actuating the conveyer to carry the vegetables through the box from rear to front the vegetables being subjected first to the action of steam, then washed and then subjected to the action of drying medium.

2. In a machine for scalding and washing vegetables, means for steaming the vegetables, a tank in which they may be washed, means for drying them, and a conveyer for presenting the vegetables to the steaming means, carrying them through the washing tank and presenting them to the drying medium.

3. An apparatus for treating vegetables consisting of an elongated chamber having its floor depressed near the middle steam nozzles in the rear of the depression, and means for supplying drying medium thereto at the front of the chamber, means for preventing the bulk of the steam in the rear from mixing with the drying medium, a conveyer resting on the floor of the chamber, and means for driving the same to carry the vegetables by the steam nozzles through the depressed portion which is filled with water, and through the drying medium.

4. In a machine for scalding and washing vegetables, the following members arranged in the order named, means for steaming the vegetables, a tank in which they may be washed, means for drying them, and means for presenting the vegetables first to the steaming, then to the washing, and then to the drying means.

Signed by me at Aberdeen, Harford county, Maryland, December 28th, 1910.

GEORGE E. WRIGHT.

Witnesses:
F. O. VIELE,
C. H. JACOBS.